Oct. 8, 1940.      H. M. EVJEN ET AL      2,217,361
GRAVITY MEASURING INSTRUMENT
Filed May 21, 1938
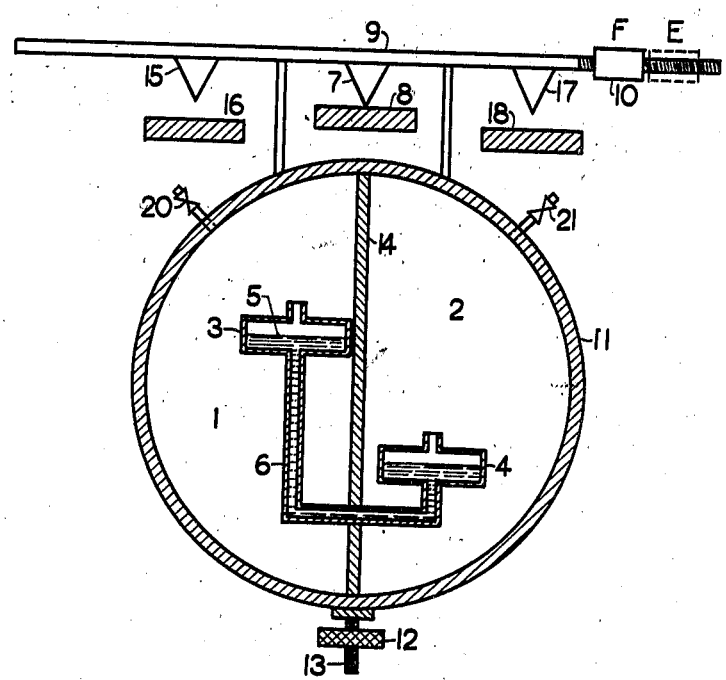
Inventors:
Haakon Muus Evjen
David Saville Muzzey Jr.
By their Attorney Patented Oct. 8, 1940

2,217,361

UNITED STATES PATENT OFFICE 2,217,361

GRAVITY MEASURING INSTRUMENT

Haakon Muus Evjen and David Saville Muzzey, Jr., Houston, Tex., assignors to Shell Development Company, San Francisco, Calif., a corporation of Delaware Application May 21, 1938, Serial No. 209,290

7 Claims. (Cl. 265—1.4)

The present invention relates to instruments for the measurement of gravitational acceleration, and pertains more specifically to a gas spring gravity meter, that is, to an instrument whereby variations of gravitational acceleration are measured by balancing the gravitational force, acting on a given mass, against a measurable force exerted by a compressed gaseous medium.

The value of gravitational measurements for the purpose of locating subterranean mass anomalies is well recognized, and these measurements have been carried out for many years in geophysical exploration by means of devices such as torsion balances and gravity meters.

The object of the present invention is to provide an improved gravity meter capable of quickly and accurately measuring changes in gravitational acceleration and free of errors due either to the structural defects or fatigue of the metallic spring members commonly used in gravity meters, or to the disturbing influence of temperature and pressure changes.

The present invention will be understood from the following description, taken with reference to the attached drawing, giving a diagrammatic cross-section view of the present gravity meter.

Referring to the drawing, a gas-tight casing or container of a suitable shape, such as a sphere 11, is supported by means of a knife-edge fulcrum 7 resting on a supporting plate or bar 8. A partition 14 separates the container 11 into two gas-tight chambers 1 and 2. Each of said chambers contains a vessel of suitable shape, such as pans 3 and 4, preferably arranged at different levels, and supported by any suitable means, such as a conduit 6, which passes through the partition 14 and serves to maintain a liquid communication between said pans. The pans 3 and 4, as well as the conduit 6 are filled with a heavy liquid or liquids, such as mercury, as shown at 5. In order to relieve the pressure on the knife edge 7, the whole structure may be submerged in a liquid of a suitable specific gravity, such as water, oil, alcohol, etc., which may be kept at a constant temperature by means of suitable thermostatic control devices.

The two chambers 1 and 2 are filled, for example, through valves 20 and 21, with the same or different gas or gases, which are maintained at different super- or sub-atmospheric pressures, the pressure difference being given by the expression:

$$p_2 - p_1 = \beta g h \qquad (1)$$

wherein $p_1$ and $p_2$ are the gas pressures in chambers 1 and 2 respectively; $\beta$ is the effective density of the communicating liquid; $g$ is the gravitational acceleration, and $h$ is the difference in elevation between the levels of the liquid in pans 3 and 4.

If the two gases are sufficiently removed from their critical points, they can be assumed to obey the ideal gas laws, and the two pressures may be represented as follows:

$$p_1 = T\frac{R_1}{V_1} \text{ and } p_2 = T\frac{R_2}{V_2} \qquad (2)$$

wherein $T$ is the absolute temperature, and $R_1$ and $R_2$ are the gas constants for the two gas volumes $V_1$ and $V_2$ in chambers 1 and 2 respectively.

These two volumes may be represented as follows:

$$V_1 = C_1 - \frac{hA}{2} \text{ and } V_2 = C_2 + \frac{hA}{2} \qquad (3)$$

wherein $A$ is the horizontal cross section area of the liquid in pans 3 and 4, assumed here, for simplicity, to be constant and to be the same for the two pans (although unequal and variable cross-sections can likewise be used), and $C_1$ and $C_2$ are constants chosen so that $C_1 = V_1$ and $C_2 = V_2$ when $h = 0$.

It is understood that these equations are subject to the condition that the total interior volume of the container 11, and also the total volume of the liquid in pans 3 and 4 and conduit 6, is constant, which is true only when the external pressure and the temperature are kept constant. If the system is subjected to any temperature and pressure variations, suitable correction factors must be introduced into said equations, as will be shown later.

Assuming, for the present purposes, the temperature and the pressure to be constant, Equations 1, 2 and 3 may be combined into the following equation:

$$g = (TA/\beta(hA))(R_2/(C_2 + (hA)/2) - R_1/(C_1 - (hA)/2)) \qquad (4)$$

Since this equation must be satisfied for any value of the gravitational acceleration, and since the only quantity which is not a constant in the right hand side of the equation is the quantity $(hA)$, it is obvious that any change in the value of the gravitational acceleration will cause a flow of the fluid from one to the other of the pans 3 and 4. Knowing the amount and the direction of said flow, the change in the value of the gravitational acceleration may be calculated from the Equation 4.

For the purpose of measuring this flow, the spherical container 11 is mounted on the knife edge 7. It is, however, understood that spring or torsion mounts are likewise applicable, and can equally well be used.

Since the free flow of the liquid from one to the other of the pans 3 and 4 is opposed only by the respective pressures of the gas in chambers 1 and 2, any deflection or tilting of said balance causes the liquid to flow from one pan to the other, and results in a further tilting of the balance, whereby the effect of the force causing the original deflection, such, for example, as a change in gravitational acceleration, is amplified, and the sensitivity of the instrument is increased.

It is well known that conditions of stable, indifferent or unstable equilibrium will obtain in any balance system if the vertical distance, $L_1$, between the center of gravity of the balance and the fulcrum has a value respectively greater, equal to or smaller than a certain critical value $L$, thus:

$L_1 > L$—stable equilibrium
$L_1 = L$—indifferent equilibrium
$L_1 < L$—unstable equilibrium In order that the present instrument may be used to measure the variations of the gravitational acceleration under any one of the above equilibrium conditions, the spherical container 11 is provided with means whereby its center of gravity may be lowered or raised with regard to the fulcrum 7. For example, the spherical container 11 may be provided on its lower outside face with a projecting member 13, which may be screw-threaded, if desired, and is adapted to support, at any desired level, one or a plurality of weights 12, whereby the system may be brought to a desired type of equilibrium condition.

When the present instrument is operated under conditions of stable equilibrium, ($L_1 > L$), determination of variations in the gravitational acceleration may be effected by measuring the flow of the liquid from one of the pans 3 and 4 to the other according to two different methods:

(1) The balance, after any deflection due to a change of gravitational acceleration, may be brought back to the original position by moving, adding, or removing a weight 10 supported on a member 9 attached to the spherical container 11, said weight being positioned laterally of the fulcrum and being therefore capable to offset the effect of a shift of gravity of the system due to a flow of the liquid 5. It is understood that, instead of the weights 10, the desired compensating torque may be applied by means of springs, torsion wires, etc.

When the balance is brought back to the original position, the following relationship is established:

$$M = mgs \qquad (5)$$

wherein $M$ is the compensating torque supplied by means of weight 10, $m$ is the mass of fluid transferred from one pan to the other, and $s$ is the distance between the centers of gravity of the liquid surfaces in pans 3 and 4.

Since the value of $m$ may be calculated from the above equation, and since the change ($\Delta$) in the quantity $(hA)$ of Equation 4 may be expressed as $$\Delta(hA) = 2m/\beta \qquad (6)$$

small changes in gravitational acceleration may be calculated by combining Equations 4 and 6:

$$\Delta g/g = -(2/(hA) + (p_2/V_2 + p_1/V_1)/(p_2 - p_1))(m/\beta) \qquad (7)$$

As an example, with an apparatus constructed according to the present invention and having the following constants:

$h = 10$ cm.
$A = 36.3$ cm$^2$
$p_2 = 86$ cm. of mercury
$p_1 = 76$ cm. of mercury
$V_1 = V_2 = 4000$ cm$^3$
$s = 12.8$ cm.

the mass of mercury flowing from one pan to the other for a $10^{-7}$ change in gravitational acceleration is equal to $(1.4)10^{-4}$ grams. With these constants, therefore, the problem of measuring said change is reduced to the problem of weighing to an accuracy of 0.28 milligram, which can easily be achieved. Likewise, under the same conditions, the compensating torque which must be supplied is of the order of $(1.8).10^{-3}$ gram cm. and can therefore be easily measured.

It is obvious that the accuracy of weighing depends on the deflection obtained for a given applied torque. This will depend on the total effective mass of the balance and on the difference $L_1 - L$. The smaller the mass, and the smaller the distance from the center of stability to the fulcrum, the greater will be the sensitivity of the balance. As stated above, the effective mass of the present system may be controlled by submerging the instrument in a suitable liquid, while the difference $L_1 - L$ may be controlled by moving, adding or removing the weights 12.

(2) The transfer of the liquid from one pan to the other under the effect of variations of the gravitational acceleration can also be measured by observing the deflection of the balance. According to this method, the balance itself supplies the compensating torque, that is, the balance is deflected until its center of gravity is sufficiently displaced to exert a moment compensating exactly for the changes of torque caused by the transfer of the liquid from one pan to the other. The amount of deflection for a given change in torque can be controlled in the manner described above.

When the present instrument is operated under conditions of indifferent equilibrium ($L_1 = L$), the sensitivity of the balance becomes infinite, the slightest change in gravitational acceleration or applied torque being sufficient to give the balance the maximum deflection which its construction will permit. When the instrument is used under these conditions, the measurement of variations in gravitational acceleration may be effected by applying a measured compensating torque sufficient to restore the conditions of indifferent equilibrium. As shown on the drawing, the beam 9 attached to the present device is provided, on either side of the fulcrum 7, with stops 15 and 17, bearing on accurately surfaced plates 16 and 18, which limit the angular motion of the balance to a relatively narrow range. The weight 10 is adjusted on bar 9 in such a position that the balance will come to rest anywhere within said range. Referring to the drawing, this position may be defined as the position half-way between the positions E and F, such that when the weight 10 is in the position E, the balance will freely move from a maximum deflection to the left, with stop 15 against plate 16, to a maximum deflection to the right, with stop 17 against plate 18, whereas when the weight 10 is in the position F, the balance will freely move from a maximum deflection to the right to a maximum deflection to the left, the time required for the balance to move from one extreme position to the other being furthermore the same in both cases. The position of indifferent equilibrium being thus defined, the following equation is applicable:

$$m_1 x = ms \tag{8}$$

wherein $m_1$ is the mass of weight 10, $x$ is the distance between positions E and F, $m$ is the mass of mercury transferred from one pan to another, and $s$ is the distance between the centers of gravity of the liquid surfaces in pans 3 and 4. Any variation of gravitational acceleration can then be calculated from Equation 7.

When the present device is operated under conditions of unstable equilibrium ($L_1 < L$), the balance will have a position of metastability where the sum of the moments about the fulcrum is equal to zero. The procedure for determining this position and measuring variations in gravitational acceleration is the same as for the condition of indifferent equilibrium, as described above.

It is understood that the present instrument, in addition to the structural parts diagrammatically indicated in the drawing, comprises a magnifying optical system whereby the deflection of the balance may be observed with great accuracy, a system of levers and clamps whereby the balance may be locked, and a system of gears whereby the weights 10 and 12 may be moved to any desired position when the balance is in a locked position. The instrument may furthermore be placed in a thermostatically controlled compartment kept at a constant temperature, since the relative sensitivity of the present device with regard to changes in gravitational acceleration is approximately the same as with regard to temperature changes. Since it may sometimes be difficult to achieve a sufficiently accurate temperature control when extreme sensitivity with regard to variations of gravitational acceleration is required, the temperature effect according to the present invention, may be eliminated or minimized in the following manner.

The chambers 1 and 2 are filled with different gases. Since the volume-pressure-temperature relationship of various gases differs from those of the so-called ideal gas, this relationship is best approximated by van der Waal's equation:

$$p_2 = (RT)/(v_2 - b_2) - (a_2/v_2^2), \tag{9}$$

and $$p_1 = (RT)/(v_1 - b_1) - (a_1/v_1^2) \tag{10}$$

wherein $a_1$, $b_1$, $a_2$ and $b_2$ are van der Waal's constants for the gases filling chambers 1 and 2, the same notation being used for the other quantities as in Equation 2 given above.

From Equation 1 it follows that if $$\partial(p_2 - p_1)/\partial T = 0 \text{ and } (\partial p_2/\partial T)_v = (\partial p_1/\partial T)_v \tag{11}$$

the system will be maintained in equilibrium at changing temperatures without change of volume, because the pressure difference remains constant. From Equations 9 and 10 it will be seen that the Equation 11 will be satisfied if chambers 1 and 2 are filled with two different gases, properly selected with regard to their van der Waal's constants, thus:

$$v_2 - b_2 = v_1 - b_1 \text{ and } p_2 - p_1 = (a_1/v_1^2) - (c_2/v_2^2) \tag{12}$$

wherein $v_1$ and $v_2$ are the respective gas volumes per mole, and $a_1$, $b_1$ and $a_2$, $b_2$ are the respective van der Waal's constants of the gases selected, as tabulated in handbooks of chemistry and physics.

Given the pressure difference and the numerical values of the van der Waal's constants of the particular gases selected, the pressures necessary to give the desired temperature compensation may be easily calculated. For practical purposes, the following simplified expression gives a satisfactory approximation:

$$p = [(p_2 - p_1)/(a_1 - a_2)]^{\frac{1}{2}} \tag{13}$$

wherein the pressures $p$, $p_1$ and $p_2$ are given in atmospheres, and $a_1$ and $a_2$ are expressed in such units that the volume of one mole of gas becomes unity at one atmosphere pressure and zero degrees centigrade. For example, referring to the example given above, it may be shown that for two gases such as hydrogen and acetylene, the pressure required for temperature compensation will be approximately 4 atmospheres for a difference of pressure of 10 cm. mercury between the chambers 1 and 2.

It is understood that owing to the approximate character of van der Waal's constants, and of the Equation 13, the compensation obtained will not be quite perfect, and it will be still necessary to maintain the temperature of the system at an approximately constant value. The permissible limits, however, will cover in such case, a considerably wider range, and the accuracy, as well as the speed of the measuring operations will be considerably increased.

It may be additionally pointed out that since, as stated above, the present device is as sensitive to variations of temperature as to those of gravitational acceleration, it may conveniently be used if desired, as a high-sensitivity thermometer. In such cases, the value of gravitational acceleration, $g$, remaining constant, the Equation 4 is solved, after carrying out the necessary measurements, for the value of the temperature T.

In a similar fashion, the present device may also be used as a high-sensitivity differential pressure gauge to measure pressure variations. In such cases, either of the chambers 1 and 2 is put in communication, for example, by means of valves 20 or 21, with the vessel containing the gaseous medium whose pressure it is desired to determine. After carrying out the measurement in a manner similar to that described above, and obtaining the necessary data, a differentiation of Equation 1 gives, for a constant gravitational acceleration, the following expression:

$$\Delta(p_2 - p_1)/(p_2 - p_1) = \Delta h/h = (m/\beta)(2/hA)$$

from which the desired pressure may be calculated with extreme accuracy.

We claim as our invention:

1. In a gravity meter, a knife edge fulcrum, a casing supported thereon, said casing comprising two gas-tight chambers maintained at different pressures, a liquid filled container in each chamber open to the pressure therein, a conduit between the two containers adapted to permit a liquid flow therebetween upon a change in the value of the gravitational acceleration, the centers of gravity of the liquid in the two containers being offset with regard to a vertical plane passing through the knife edge.

2. In a gravity meter, a knife edge fulcrum, a gas-tight spherical casing supported thereon, a partition dividing said casing into two gas-tight chambers maintained at different pressures, a liquid filled container in each chamber open to the pressure therein, a conduit passing through the partition between the two containers adapted to permit a liquid flow therebetween upon a change in the value of the gravitational acceleration, the centers of gravity of the liquid in the two containers being offset with regard to a vertical plane passing through the knife edge.

3. In a gravity meter, a balance system comprising a knife edge fulcrum, a casing supported thereon, said casing comprising two gas-tight chambers maintained at different pressures, a liquid filled container in each chamber open to the pressure therein, a conduit between the two containers adapted to permit a liquid flow therebetween, upon a change in the value of the gravitational acceleration, the centers of gravity of the liquid in the two containers being offset with regard to a vertical plane passing through the knife edge, and means comprising at least one adjustable weight supported by the balance system adapted to displace the center of gravity of said system.

4. In a gravity meter, a casing, balancing means to support said casing, said casing comprising two gas-tight chambers maintained at different pressures, a liquid filled container in each chamber open to the pressure therein, a conduit between the two containers adapted to permit a liquid flow therebetween upon a change in the value of the gravitational acceleration, the centers of gravity of the liquid in the two containers being offset with regard to a vertical plane passing through the center of gravity of the casing at right angles to a vertical plane passing through the centers of gravity of said liquid in the two containers.

5. The gravity meter of claim 1, the chambers of said gravity meter being filled with two different gases.

6. In a gravity meter, a casing, balancing means to support said casing, said casing comprising two air-tight chambers filled with different gases and maintained at different pressures, a liquid filled container in each chamber open to the pressure therein, and a conduit between the two containers adapted to permit a liquid flow therebetween upon a change in the value of gravitational acceleration, the centers of gravity of the liquid in the two containers being offset with regard to a vertical plane passing through the center of gravity of the casing at right angles to a vertical plane passing through the centers of gravity of the liquid in said two containers, said two gases being selected so that the differences between the gas volumes per mole, at the temperature and pressure used and the respective van der Waals $b$ constants of said two gases are approximately equal, and the pressures of said two gases being selected so that the difference between the pressures of the second and the first gas is approximately equal to the difference between the van der Waals $a$ constant of the first gas divided by the square of its volume per mole at the temperature and pressure used, and the van der Waals $a$ constant of the second gas divided by the square of its volume per mole at the temperature and pressure used.

7. In a gravity meter, a casing, balancing means to support said casing, said casing comprising two gas-tight chambers maintained at different pressures, a container holding a body of liquid in each chamber, each of said containers being open to the pressure in the chamber, a conduit between the two containers adapted to permit a liquid flow therebetween upon a change in the value of the gravitational acceleration, the center of gravity of the body of liquid in each container being offset with regard to a vertical plane passing through the center of gravity of the casing at right angles to a vertical plane passing substantially through the centers of gravity of the bodies of liquid held in the containers, and means comprising at least one weight adjustably supported by the casing for displacing the center of gravity of the casing.

HAAKON MUUS EVJEN.
DAVID SAVILLE MUZZEY, Jr.